UNITED STATES PATENT OFFICE.

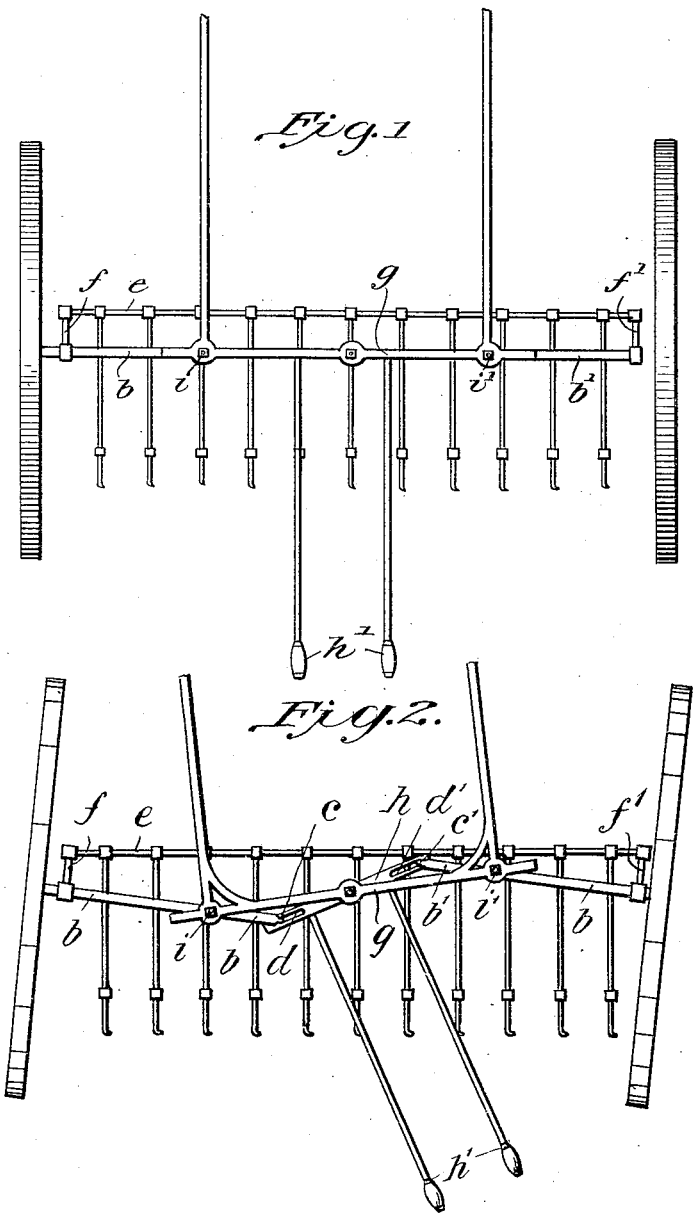

ERNST GRÖSCHNER, OF KERSTENHAUSEN, GERMANY.

STEERING MECHANISM FOR WHEELED AGRICULTURAL IMPLEMENTS.

1,050,125.  Specification of Letters Patent.  Patented Jan. 14, 1913.

Application filed October 27, 1911. Serial No. 657,049.

*To all whom it may concern:*

Be it known that I, ERNST GRÖSCHNER, a subject of the Emperor of Germany, and resident of Kerstenhausen, in the district of Fritzlar, Hesse-Nassau, Germany, have invented certain Improvements in Steering Mechanisms for Wheeled Agricultural Implements, of which the following is a specification.

This invention relates to improvements in steering mechanisms for agricultural implements such as wheeled harrows and the like and consists in the provision of a jointed axle-bar so connected with the shafts and the steering handles as to permit a regular course being kept by the knives of the machine independently of the deviation therefrom of the draft-animals.

The invention is illustrated by way of example in the accompanying drawings, Figure 1 representing a plan of the machine showing the position of the elements when the machine runs in the exact direction of the pull, and Fig. 2, a similar view showing the steering elements adjusted for setting the road wheels at an angle to such direction.

Axle-bars $b$ and $b^1$, terminating in pivots $c$ and $c^1$ set at right angles to the bars, are provided for the wheels of the machine, and on brackets $f$ and $f^1$, connected to said bars, the frame $e$ carrying the knives is pivotally suspended. To the axle-bars $b$ and $b^1$ and at some distance from their ends is pivoted by means of bolts $i$ and $i^1$ a cross-bar $g$ to the ends of which the shafts of the machine are fixed.

The pivots at the ends of the axle-bars are received and guided in slots $d$ and $d^1$ provided at the ends of a steering bar $h$ to which the steering handles $h^1$ are fixed. The cross-bar $g$ is also pivoted with its center to the center of the steering bar.

The advantage of the arrangement is that it allows a sinuous course of the furrows to be followed without alteration of the angle of the knives relative to the direction of the movement. It also allows the machine to be steered independently of the movements of the draft-animals. This is accomplished by turning the steering handles, as shown in Fig. 2, for setting the wheels in the desired direction.

I claim:

In a wheeled agricultural implement, an axle-bar for each wheel terminating in a pivot set at right angles to the bar, a steering bar provided at its ends with longitudinal slots to receive and guide said pivots, a cross-bar, bearing the shafts of the machine, pivoted with its center to the center of the steering bar and with its ends to the axle-bar at some distance from the ends of the latter, the frame of the machine being pivotally suspended on brackets connected to the axle-bars, and steering handles connected to the steering bar allowing the wheels of the machine to be set at varying angles relative to the frame to effect the steering, substantially as set forth.

ERNST GRÖSCHNER.

Witnesses:
GUSTAV WILHELM,
ALBERT LIBETRARY.

Copies of this patent may be obtained for five cents each, by addressing the "Commissioner of Patents, Washington, D. C."